(12) United States Patent
Kolar et al.

(10) Patent No.: US 11,521,514 B2
(45) Date of Patent: Dec. 6, 2022

(54) REFRESHABLE BRAILLE DISPLAY

(71) Applicants: Prithu Kolar, Cary, NC (US); Pramod Kolar, Cary, NC (US)

(72) Inventors: Prithu Kolar, Cary, NC (US); Pramod Kolar, Cary, NC (US)

(*) Notice: Subject to any disclaimer, the term of this patent is extended or adjusted under 35 U.S.C. 154(b) by 92 days.

(21) Appl. No.: 17/240,744

(22) Filed: Apr. 26, 2021

(65) Prior Publication Data

US 2021/0366309 A1 Nov. 25, 2021

Related U.S. Application Data

(60) Provisional application No. 63/027,213, filed on May 19, 2020.

(51) Int. Cl.
*G09B 21/00* (2006.01)
(52) U.S. Cl.
CPC .................. *G09B 21/004* (2013.01)
(58) Field of Classification Search
CPC .................................................. G09B 21/004
See application file for complete search history.

(56) References Cited

U.S. PATENT DOCUMENTS

| 7,226,291 B2* | 6/2007 | Spedden | G09B 21/003 |
| | | | 340/407.1 |
| 10,083,628 B2* | 9/2018 | Yip | G09B 21/004 |
| 2019/0266917 A1* | 8/2019 | Madolell Domenech | |
| | | | G06F 3/041 |

* cited by examiner

*Primary Examiner* — Vinh T Lam
(74) *Attorney, Agent, or Firm* — Suparna Kanjilal

(57) ABSTRACT

A refreshable braille display device is provided comprising a plurality of Braille pins running through a perforated body of the reader, the pins arranged in the spacing and order of Braille dots of standard Braille cells. The Braille reader may be coupled to a device for Braille text generation via selective hammering or impacting of Braille pins. From a default position where all pins of the reader are raised relative to a first, front surface of the reader, one or more pins are selectively impacted in a sequence to create a Braille pattern of raised and lowered pins based on a desired text conversion.

20 Claims, 11 Drawing Sheets

REFRESHABLE BRAILLE DISPLAY

CROSS REFERENCE TO RELATED APPLICATIONS

The present application claims priority to U.S. Provisional Patent Application No. 63/027,213, filed May 19, 2020.

FIELD OF THE INVENTION

The present invention is directed to a low-cost refreshable Braille display with Braille pins that are held in place passively, without external support.

BACKGROUND

Braille is a tactile writing system used by people who are visually impaired. Braille text includes a series of characters, each character depicted as a specific combination of dots and spaces on a Braille cell. An example Braille cell is characterized by 6 dots arranged in a 2 by 3 matrix. The specific arrangement of the dots in the matrix may vary as a function of the language encoded by the Braille text (e.g., english versus arabic versus mandarin).

Typically, Braille documents are generated by embossing dots on Braille paper that is thicker and sturdier than regular print paper. However, Braille paper is expensive and can be cost-prohibitive. Further, once embossed with text, the Braille paper cannot be reused to display any alternative text. In recent years, refreshable Braille displays (RBDs) have been developed to provide visually impaired people with more options for access to text-based material. Therein, an electro-mechanical Braille terminal converts the output of an associated computer or computer monitor into Braille cells with Braille dots. Typically, the terminal displays one row of Braille text at a time. The row of Braille cells can be refreshed by repositioning the dots after the user has completed reading the displayed text.

Various technologies are currently used for generating and refreshing Braille dots in such RBDs. In some examples, where the dots are created by round-tipped pins that are raised through holes in a flat surface of the Braille terminal, the pins are held in their position via the use of electric force (e.g., via electric motors and batteries) or an active latching mechanism that mechanically holds the pins in a raised position. When the electric force or the latching mechanism is released, the pins are returned to a lowered position, thereby refreshing the display. The electric force or latching mechanism can then be used to raise the pins in another sequence to display a new text. In other examples, RBDs may use piezoelectric technology, shape memory alloys, or elastomeric materials to generate individual Braille dots whose shape and position can be maneuvered. Still other active mechanisms can be used for holding Braille dots in a raised position during a reading operation.

However, such RBDs have a variety of issues. First, they typically are limited to displaying only one row of Braille text at a time. This limits the amount of text that can be displayed. It also limits the non-textual material that can be displayed (such as graphs, maps, etc.). Secondly, the user has to stay close to the computer and associated RBD terminal to read the text.

As a further issue, RBDs are expensive to manufacture and operate. In addition to being cost-prohibitive, they can also be power intensive. Furthermore, to enable the Braille cells of such displays to match standard Braille dot sizes (which are in the millimeter range), significantly complex latching and actuations mechanisms may be required.

As a result, RBDs and Braille paper have remained inaccessible to a large percentage of users, such as those in developing countries with limited resources and inconsistent power supply. Therefore, affordable Braille readers that can be refreshed and operated with reduced power dependency need to be developed to allow access to a larger population. Furthermore, it may be desirable to provide a Braille reader that can be separated from a computer terminal and read anywhere, akin to Braille paper.

SUMMARY

The present invention relates to a refreshable braille display system having a refreshable Braille reader (or Braille display device) configured with a plurality of Braille pins running through a perforated body of the reader, the pins arranged in the spacing and order of Braille dots of standard Braille cells. The Braille reader may be coupled to a text generating device for Braille text generation via selective hammering or impacting of Braille pins. From a default position, where all pins of the reader are raised (or lowered) relative to a first, front surface of the reader, one or more pins are selectively impacted in a sequence to create a pattern of raised and lowered pins based on a desired text conversion. By impacting pins on a first (e.g., front) surface of the Braille reader, Braille text is selectively created on the first surface, or on a second, opposite (e.g., rear) surface of the reader. When the second surface of the reader is used for display, the impacted Braille pins are raised on the second surface, creating a texture akin to Braille dots on Braille paper. When the first surface of the reader is used to display Braille text, the impacted Braille pins are lowered on the first surface while unimpacted pins remain raised, creating a texture akin to Braille dots on Braille paper. The perforations through the body of the reader that house the pins are sized such that the impacted pins are self-held in place via friction alone, and without the need for any external support or latching mechanism. The reader can optionally be uncoupled from the text generation device, allowing the user to read the whole text at any location at their leisure. Thereafter, the reader can be recoupled to the same text generation device, and the device can be used to both refresh the reader and generate new text for display.

DETAILED DESCRIPTION

Methods and devices are provided for displaying a pattern of raised and lowered pins (herein also referred to as a Braille pattern) representative of an equivalent Braille text to a visually impaired person. The device enables Braille pins displaying a Braille pattern, representative of a Braille text, to be held in position without the need for mechanical or powered latching means. The device may be integrated with a personal computer or smartphone so as to display Braille text corresponding to text retrieved on a display device of the personal computer. Alternatively, the device may be used independently for displaying a desired text. By providing a low-cost, power-independent mechanism, Braille readers can be provided to a wider segment of visually impaired population. Methods are also provided for rapid generation of text and refreshing of text on Braille readers via a unidirectional movement of an impact driver over an array of Braille pins.

Figure 1:
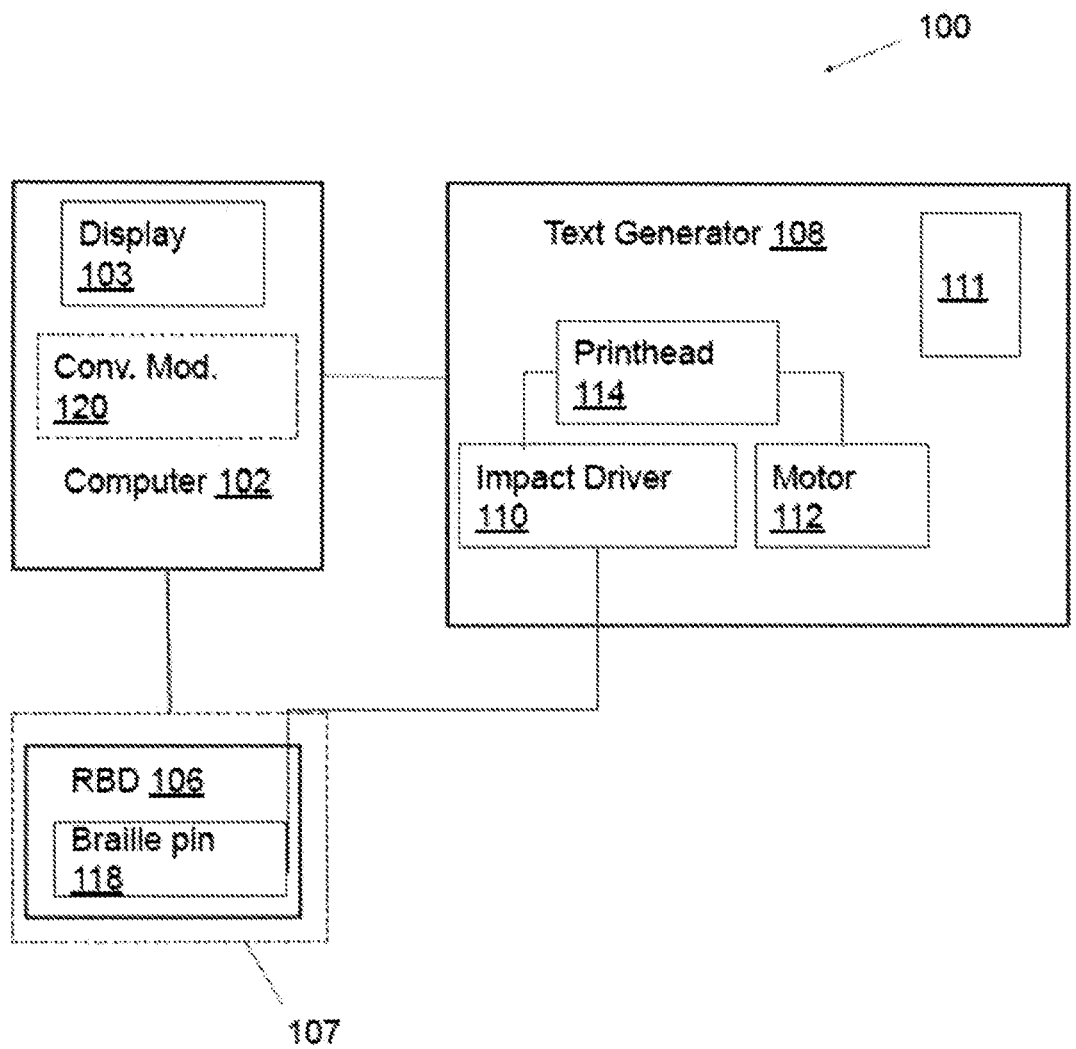
FIG. 1 shows an example refreshable Braille display system comprising a Braille reader with Braille input pins running there-through and a Braille text generator for generating a pattern of raised and lowered pins representative of Braille text on the Braille reader.

FIG. 1 shows an example embodiment of a Braille display system 100. The system includes a computer, or controller 102. The computer may be a personal computer, or any other microprocessor, being used for retrieving and displaying a text to a visually impaired person. Text may be retrieved from a database (local or remote), or from an internet server 104. Computer 102 may also include smart devices, such as smartphones, smart watches, tablets, etc. In some examples, the computer 102 includes any device configured to store data, and/or retrieve data from a server 104, such as an internet or cloud-based server, via wired or wireless communication. As used herein, it will be appreciated that text is used generically to refer to any content that is displayed on a display device 103 of the computer, the content eventually converted into a Braille format, such as into Braille text, for haptic display to a visually impaired person on the refreshable Braille reader 106 of the present invention. Thus, while text may include textual content from books, websites, documents, etc., text may also include content displayed in the form of graphs (e.g., figures, pie charts, maps, etc.) as well as spreadsheets, images, etc. Still other forms of content to be displayed in Braille format is generically referred to herein as text.

Computer 102 is coupled to a text generator 108. Text generator 108 is configured to convert the text retrieved on computer 102, and displayed on display device 103, into a Braille pattern for display on reader 106. The received text may include text in any language such as English, French, Hindi, Mandarin, a vernacular language, a mathematical language, code-based language, natural languages, etc. As used herein, Braille text refers to a series of Braille characters comprising dots and spaces, and the Braille pattern refers to a specific, individual pattern of raised and lowered Braille pins generated via applying an impacting force on selected Braille pins 118 of reader 106. It will be appreciated that the Braille text and corresponding Braille pattern may include Braille text corresponding to any language. Based on the language, for a given alphabet letter, the arrangement of Braille dots in a Braille matrix will vary. In some embodiments, the received text and the Braille text (and resulting Braille pattern) are a common language, such as the received text being English text and the Braille pattern being representative of English Braille text. In other embodiments, the received text corresponds to a first language while the Braille pattern is representative of Braille text of a second, different language. For example, the received text may be in English while the Braille pattern displayed on the reader corresponds to Mandarin Braille text. As elaborated below, by adjusting the position of the Braille pins relative to a planar surface of the reader, haptic feedback may be created on the reader 106 that is akin to embossed Braille dots. This enables a visually impaired user to read the Braille pattern as Braille text.

In some examples, computer 102 may include hardware and/or software for a conversion module 120 that includes instructions for converting text displayed on computer 102 to the Braille text and the equivalent Braille pattern. Alternatively, the conversion module may be included in text generator 108. As elaborated with reference to FIG. 8, the conversion module 120 may convert each character of text displayed on computer 102 to corresponding Braille characters, each character defined by a specific sequence of dots and spaces in a specified Braille matrix (e.g., a 2×3 matrix). In embodiments where the received text and the displayed Braille pattern correspond to different languages, the computer 102 or the text generator 108 may be configured with an additional translation module that enables concurrent translation of the text. Alternatively, the conversion module 120 may include instructions for text translation. As elaborated with reference to FIGS. 8 and 9, the series of Braille characters may then be converted into a series of commands that indicate where a given Braille pin needs to be impacted (I-pin) or not (O-pin) to generate the corresponding Braille pattern.

Text generator 108 includes one or more impact drivers 110 powered by a motor 112. In one example, motor 112 is an electrically driven motor which may be powered by a battery or via direct electrical supply. In still another example, the motor may be driven by a renewable source of power such as solar energy (e.g., through the use of solar cells coupled to the text generator). In one embodiment, where the impact driver(s) 110 are driven by a battery powered motor, the battery may be contained within a housing of the text generator. Operation of the impact drivers and/or motors may be directed based on signals received from a microprocessor 111 of the text generator. The microprocessor may be configured with computer-readable instructions that, when executed, actuate the impact driver to apply an impacting force on one or more Braille pins of display device 103, thereby creating a pattern of raised and lowered pins which correspond to a Braille text. The computer-readable instructions may comprise instructions as to the identity of which pins to be impacted. Additionally or optionally, the instructions may comprise instructions as to the amount of impacting force to be applied, which can affect the extent to which a pin is raised or lowered relative to the surface of the reader. This may be particularly useful when rendering a Braille pattern representative of non-textual content such as images, geographic features (e.g., hills and valleys, etc.). The resulting pattern of raised and lowered pins can then be read by a user using tactile interaction between the user's fingers and the pins. In other embodiments, the actuation of the impact driver and motor may be based on signals received from computer 102.

One or more impact drivers 110 may be provided in text generator 108. Each impact driver may be configured as a rod-like device with a terminal impact surface that makes contact with a single Braille pin upon actuation of the impact driver. Alternatively, the impact driver may be configured as a small hammer. The impact driver is sized to only impact a single Braille pin at a time. This allows for increased accuracy of Braille text generation. As described below, upon contact, the impact driver moves the corresponding Braille pin into a plane of the Braille reader.

In one example embodiment, multiple impact drivers may be arranged in an array, such as 6 impact drivers arranged in accordance with a standard 2×3 Braille cell matrix. In such an arrangement, the multiple impact drivers may be actuated in synchrony to impact Braille pins of a single Braille cell and generate a single Braille character in one go. Then, a moveable printhead moves the array of impact drivers to the next Braille cell to impact Braille pins in the array of that Braille cell and generate the next Braille character. Alternative embodiments, without departing from the scope of the disclosure, may include multiple impact drivers per row of the reader, a single impact driver per row of the reader, a single impact driver per Braille cell of the reader, etc.

Figure 7A:
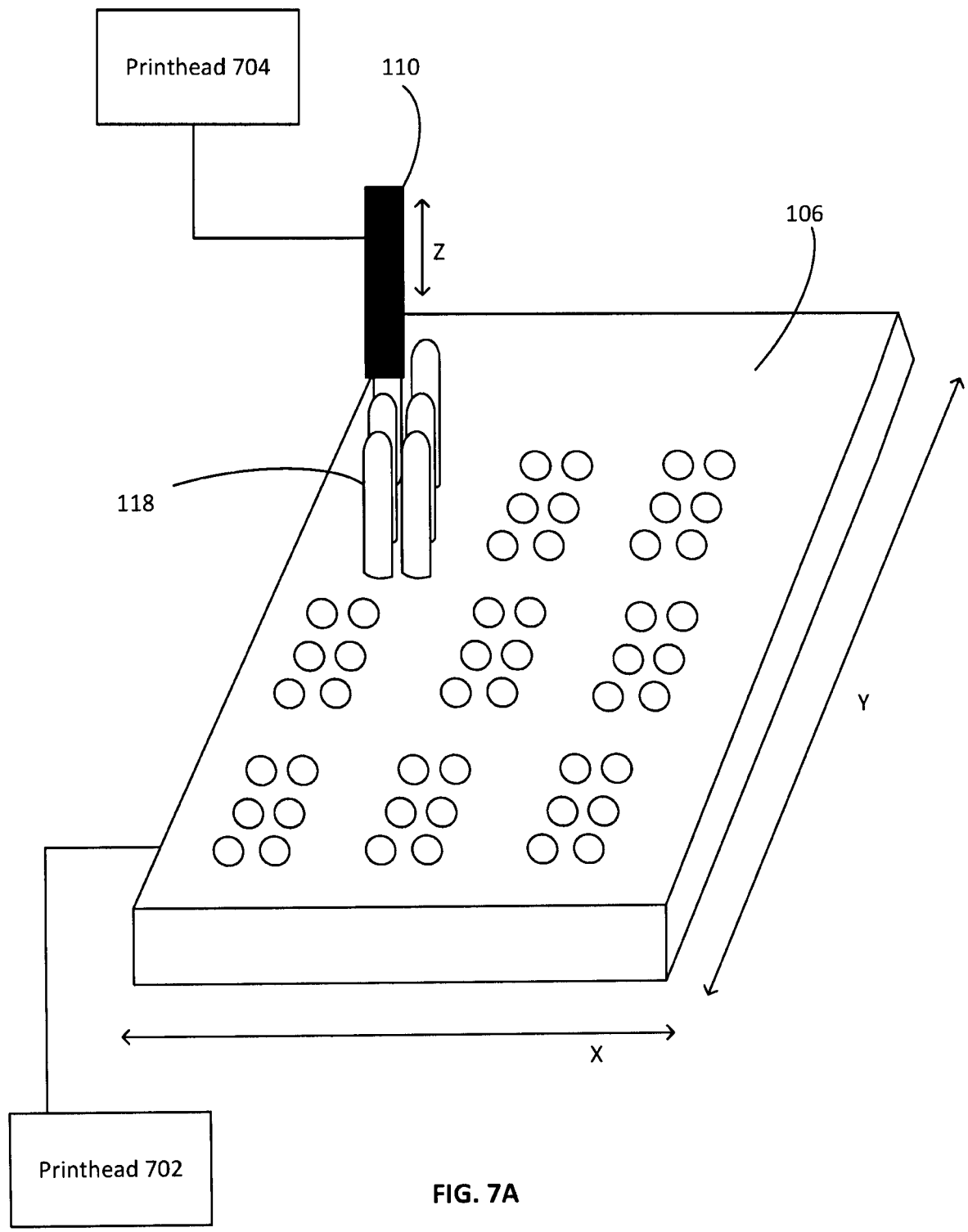
FIGS. 7A-B shows example embodiments of operation of a Braille text generator for generating Braille text on a Braille display device.
Figure 7B:
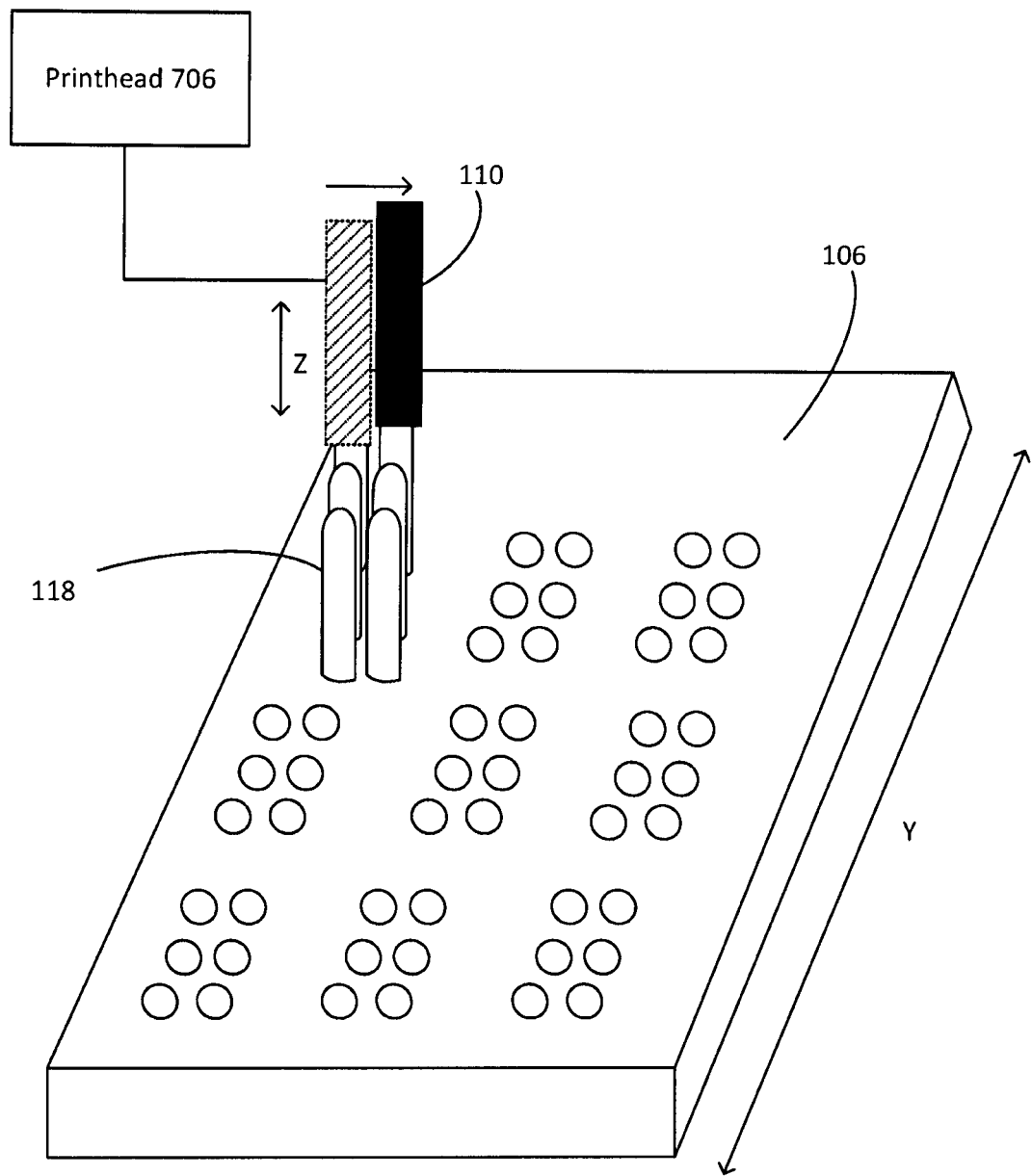

In another example embodiment, described herein, the text generator 108 includes a single overall impact driver 110 that is moved along a length and breadth of reader 106 via a movable printhead 114. The printhead may be coupled to one or more gears such that it is configured to move horizontally or vertically along a planar surface of the reader. Further, different printheads may be dedicated for moving the impact driver versus moving the reader. Example actuation of the moveable printhead along an x-y plane is shown at FIGS. 7A-B. In some embodiments, the moveable printhead moves the impact driver along the x-y plane via the use of a linear toothed rack gear. In still other examples, various combinations of linear gears (such as linear toothed spur gears), rotatory gears, and cams may be used. Further, the moveable printhead 114 may include any mechanism as commonly known in the art that enables the impact driver 110 to be moved over the reader 106.

FIG. 7A shows a first example embodiment wherein a first printhead 702 is responsible for moving the reader 106 along an x-y plane to position a selected Braille pin 118 below the impact driver 110 while a second printhead 704 moves the impact driver along a z-plane to impact the selected Braille pin 118. FIG. 7B shows another example embodiment wherein a single printhead 706 is responsible for moving the impact driver in an x-y plane to position the impact driver over a selected Braille pin 118 (as shown by moving of the impact driver from an earlier position indicated in a shaded format to a final position in the solid format). Further, the same printhead 706 is responsible for moving the impact driver in a z-plane to impact the selected Braille pin. It will be appreciated that while the depicted example shows the printheads configured to actuate the impact driver from above the reader 106, in other embodiments, the printheads may be configured to actuate the impact driver from below the plane of the RBD without departing from the scope of the invention.

Figure 5:
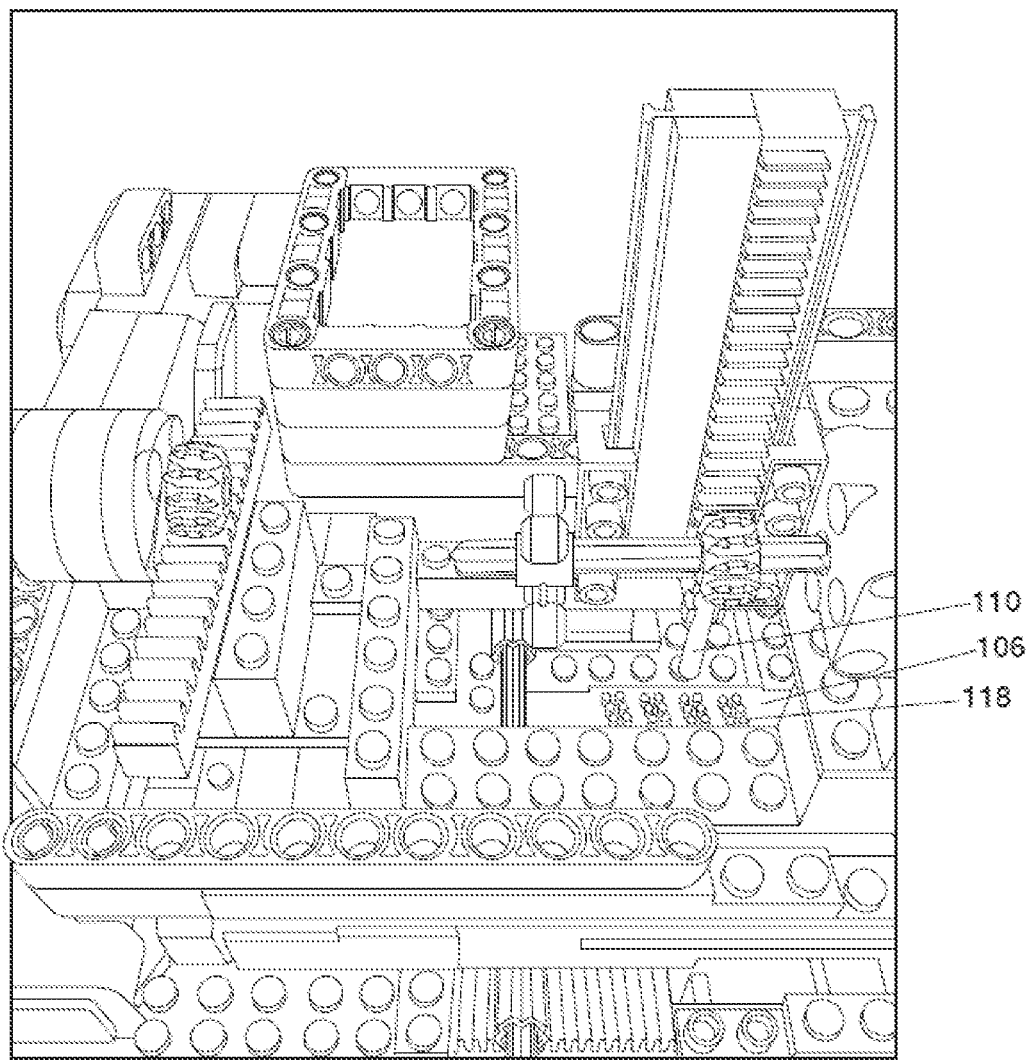
FIG. 5 shows a perspective view of a Braille text generator in accordance with an embodiment of the present disclosure.
Figure 6:
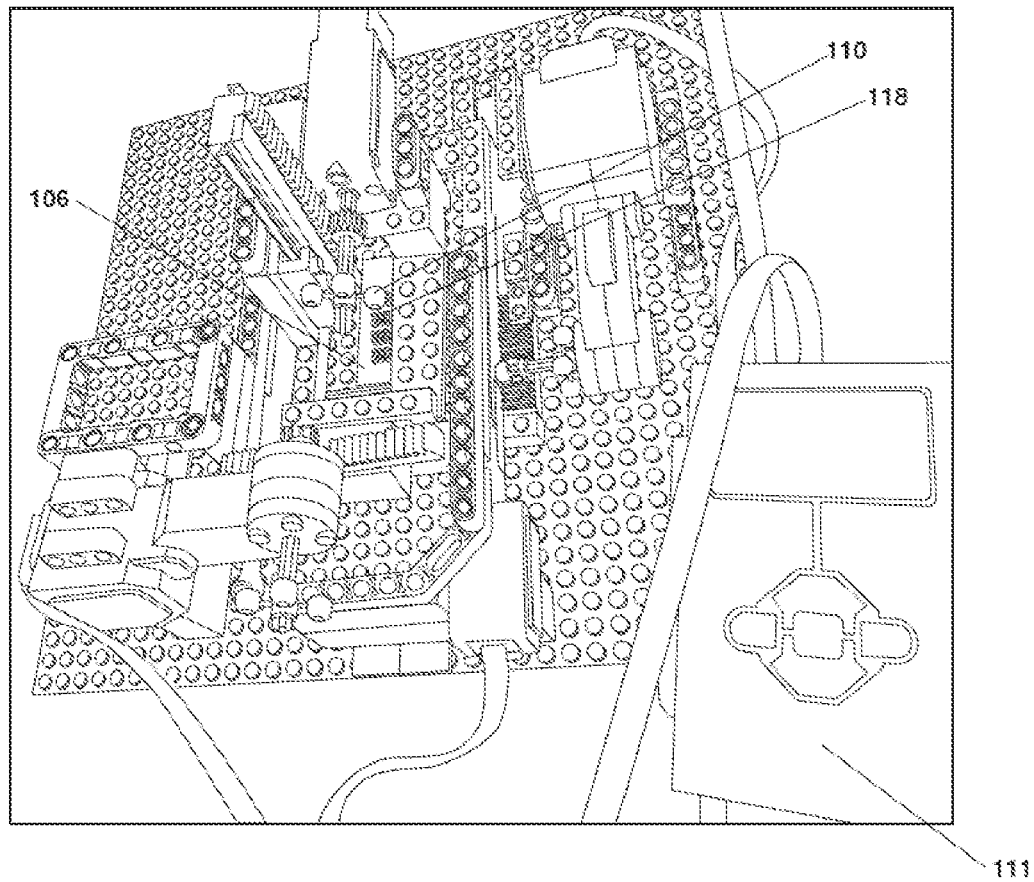
FIG. 6 shows a side view of the Braille text generator of FIG. 5.

As such, various embodiments are envisioned for the text generator 108. As a non-limiting example, easily available "off the shelf" modular elements and robotics components may be used. FIGS. 5-6 depict side and perspective views of a text generator developed using elements from a commercially available LEGO (Trademark) robotics kit including modular bricks, gears, sensors (TECHNIC trademark products in the depicted example of FIGS. 5-6), and a programmable microcontroller (EV3 trademark microcontroller in the depicted example of FIGS. 5-6). Other types of commercially available building blocks and DIY robotic kits may be similarly used.

Figure 2:
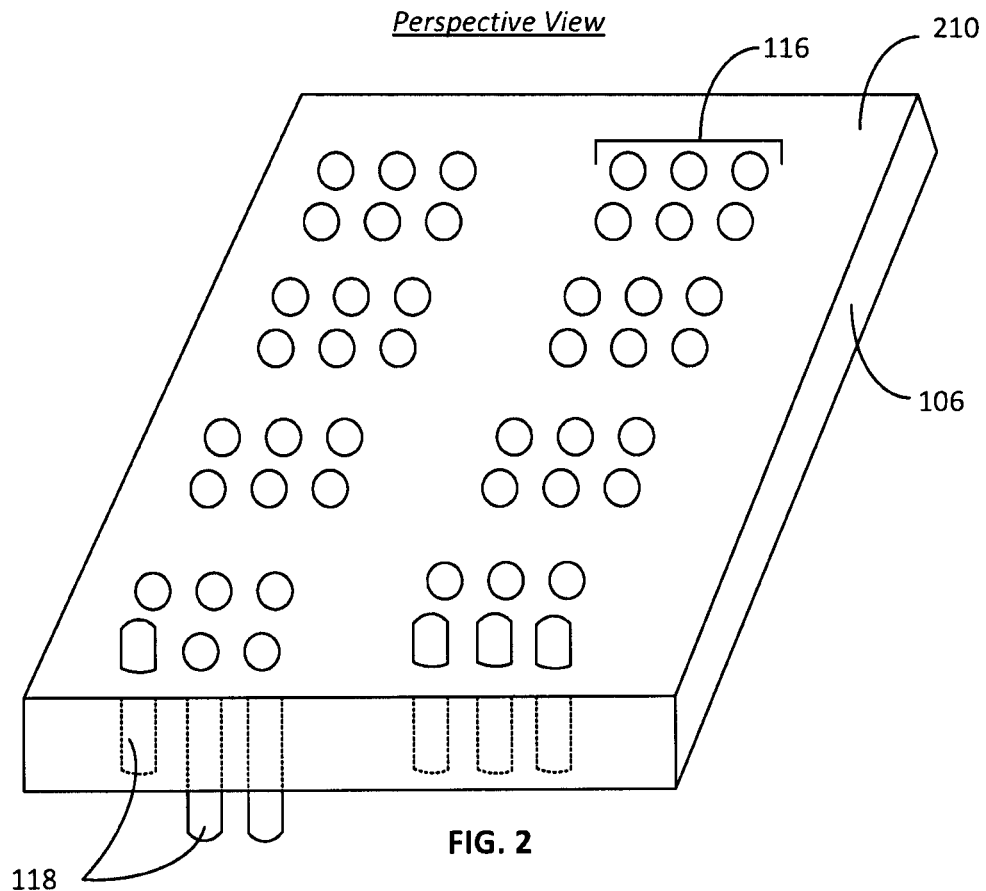
FIG. 2 shows a top perspective view of a Braille display device in accordance with an embodiment of the present disclosure.
Figure 3:
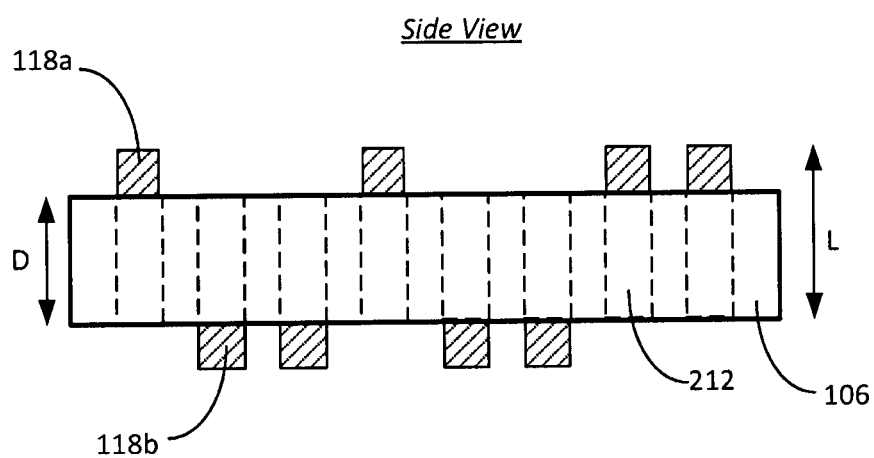
FIG. 3 shows a side view of the Braille display device of FIG. 2.

As shown at FIGS. 2-3, reader 106 may include an array 116 of individually movable pins 118 that can be driven into the plane of the reader upon impact by the impact driver. Each pin can be moved in a direction perpendicular to the plane of the device. Ideally, each pin is actuated between a first position where a first end of the pin is embedded in the plane of the device while a second, opposite end of the pin is raised (or lowered) relative to the plane of the device; and a second position where the second end of the pin is embedded in the plane of the device and the first end is raised (or lowered) relative to the plane. One of the first and second positions may be a default position of the pins in the reader 106. Thus, during operation, the printhead may move along an x-y plane to position the impact driver over a specific moveable pin 118 of the array 116, and then the impact driver is actuated in a z-direction.

In some examples, the impact driver may be moved over the planar surface of the reader by the printhead and then actuated downwardly. Herein, the impact driver is actuated to impact pins from above, thereby driving an impacted pin from a default position extending above the plane of the reader into the plane of the reader. In other examples, the impact driver may be moved under the planar surface of the reader to impact pins from below, thereby driving an impacted pin from a default position extending below the plane of the reader into the plane of the reader. A direction of impacting may be determined based on various considerations such as housing and spatial constraints, as well the reader face (front or rear face) that is to be provided to the user and read by the user.

Reader 106 may be sized and shaped as desired. For example, reader 106 may be sized to correspond to a Braille terminal attached to computer 102. The Braille terminal may be a standard sized terminal displaying 20 to 80 Braille cells. In other examples, reader 106 may be sized to correspond to a standard sheet of paper used in a printer, such as A4 sized paper, letter sized paper, etc, with multiple rows and columns of Braille cells (e.g., multiple rows of 20-80 Braille cells). Further still, reader 106 may be sized to correspond to a tablet or other display device.

Reader 106 may be made of plastic, polymers, silicone, or any other material. In some embodiments, such as where the reader is manufactured via 3D printing, the reader may be made of a material compatible with 3D printing, such as polyamides, polypropylenes, polycarbonates, etc. Braille pins 118 embedded into the reader may be made of any material that does not deform immediately upon impact by the impact driver 110. For example, the pins may be made of metal wire, extruded plastic or resins, etc. The terminal ends of each pin may be softened and optionally rounded to improve a user's tactile experience.

As shown in FIGS. 2-3, reader 106 may include a planar surface 210 on which Braille pins 118 are arranged at uniform intervals. Reader 106 may have a depth D that is smaller than the length L of a given Braille pin 118. A plurality of bores 212 may be provided through a depth of the planar surface of the reader, each bore supporting a Braille pin therein. The Braille pins are of uniform size. In one example embodiment, when raised (or lowered) relative to the planar surface 210 (such as raised segment 118a or lowered segment 118b), the region of the Braille pin exposed to the user's fingers corresponds to the size of a standard embossed Braille dot. In some embodiments, the terminal ends of the Braille pin may have a stopping mechanism, such as a disc of larger radius than the radius of the pin, that prevents the terminal end of the Braille pin from being driven inside the planar surface of the reader when impacted by the impact driver.

In some embodiments, pins of reader 106 may be adjusted both in size and clustering so that the display generates patterns representative of Braille characters that are the same size as conventional Braille characters. However, in other embodiments, the pins may be sized and positioned such that the display generates patterns representative of Braille characters that have been scaled up or down relative to a conventional character, or that are representative of an alternate Braille font type.

Figure 4:
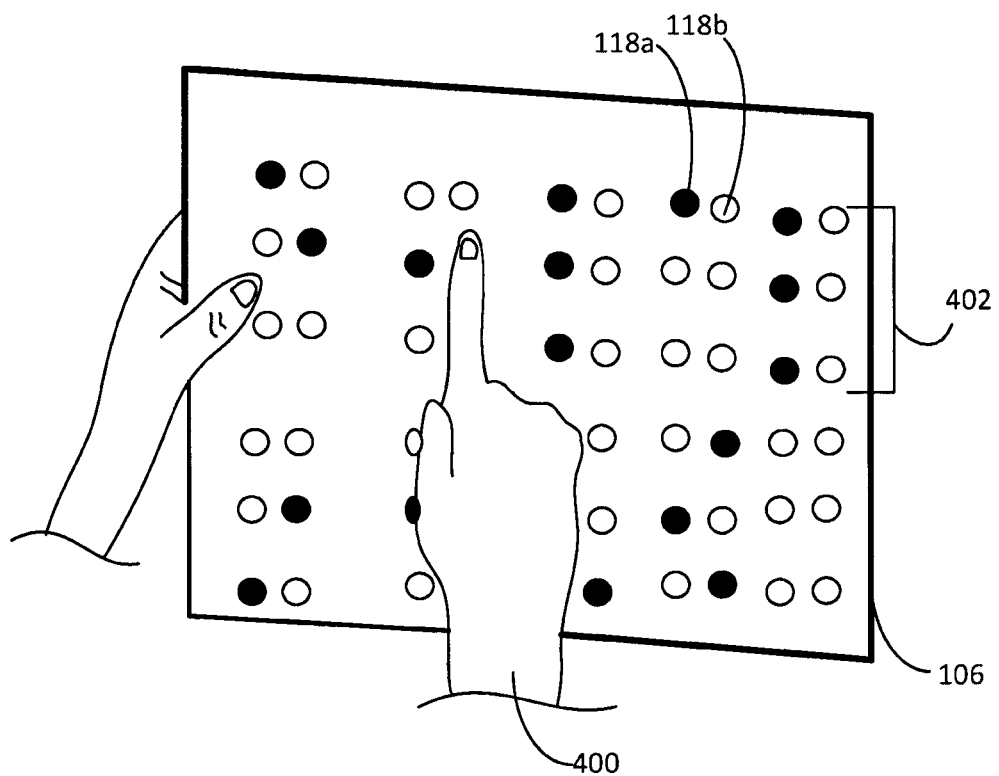
FIG. 4 shows an example usage scenario of the Braille display device.

An example usage of the disclosed reader is shown at FIG. 4 wherein a user 400 holds the reader 106 and moves their finger over the series of raised and lowered Braille pins 118a, 118b to identify Braille characters corresponding to the specific sequence of pins in each Braille cell 402.

Braille pins 118 may be provided at the reader 106 at uniform intervals that correspond to the standard spacing between Braille dots of a standard Braille cell. In one example embodiment, the height of each Braille pin is selected so that the nominal height of each pin relative to the planar surface of the reader 106 is at least 0.019 inches [0.48 mm]. Each pin may have a nominal base diameter of 0.057 inches [1.44 mm]. Pins are arranged so that the nominal distance from the center of one pin to the center of an adjacent pin (horizontally or vertically, but not diagonally), at least in reference to a given Braille cell, is at least 0.092 inches [2.340 mm]. Further, pins may be arranged in cell-wise format to provide a nominal distance of at least 0.245 inches [6.2 mm] from center to center of corresponding pins in adjacent cells. Further, line spacing between Braille pins on one line and a subsequent line may be 0.400 inches [1.000 cm]. By arranging the pins on the reader to be in conformity with standard Braille dot positioning, a user may be able to effortlessly transition from embossed Braille dots as provided on standard Braille paper and the Braille reader of the present invention.

In some examples, Braille reader 106 may have a rectangular frame surrounding the edges of the planar surface. The frame may be designed to allow for easy attachment and detachment from a Braille terminal coupled to a computer, and/or to provide the user with an easy way to hold the device. The frame may include ergonomic features, such as ergonomic angles, handles, loops, and bends, to improve user handling experience. In embodiments where only one of the reader surfaces (e.g., front or rear) is used to display Braille text, the reader may have a marking, such as a notch, a raised design, a rib, a logo, etc., that enables a user to know which surface is to be read.

Once a user has finished reading the Braille pattern displayed on Braille reader 106, the display may be refreshed. Various methods may be used to refresh the display. A "refresh" function may be included in the text generator, such as in the form of a refresh module. As one example, when a "refresh" command is received from the user at the computer, a "refresh" action is performed at the text generator 108 wherein the printhead moves the impact driver over each unimpacted Braille pin (O-pin) of the display device and drives it in such that at the end of the refresh operation, all Braille pins are returned to a default position in which each Braille pin is pushed in (all I-pin configuration). In other examples, the refresh function may be provided via a mechanism that is separate from the text generator. In some embodiments, instead of use the text generator having a motor actuated impact driver to impact the pins, refreshing is achieved manually. Therein, impacting individual pins of the reader 106 can be achieved manually. For example, a manual device, such as a mallet, mechanical roller or hammer, or a stamp with a flat surface, may be used by the user to refresh the Braille reader by manually driving all Braille pins into the default position. In one example, the user may move the roller or stamp over the surface of the reader 106 to drive all pins to the default position. Still other methods of refreshing may be used. Once refreshed, the Braille reader 106 is ready for displaying new Braille text or content. If manually refreshed, the user may reload the reader into the text generator so that it is ready for generating a new Braille text via the impact drivers. The reader is reloaded into the text generator in a configuration based on a selection of the surface onto which the new Braille text is to be generated. An example refresh operation performed via impact driver(s) of a text generator is described below with reference to method 1000 of FIG. 10.

Figure 8:
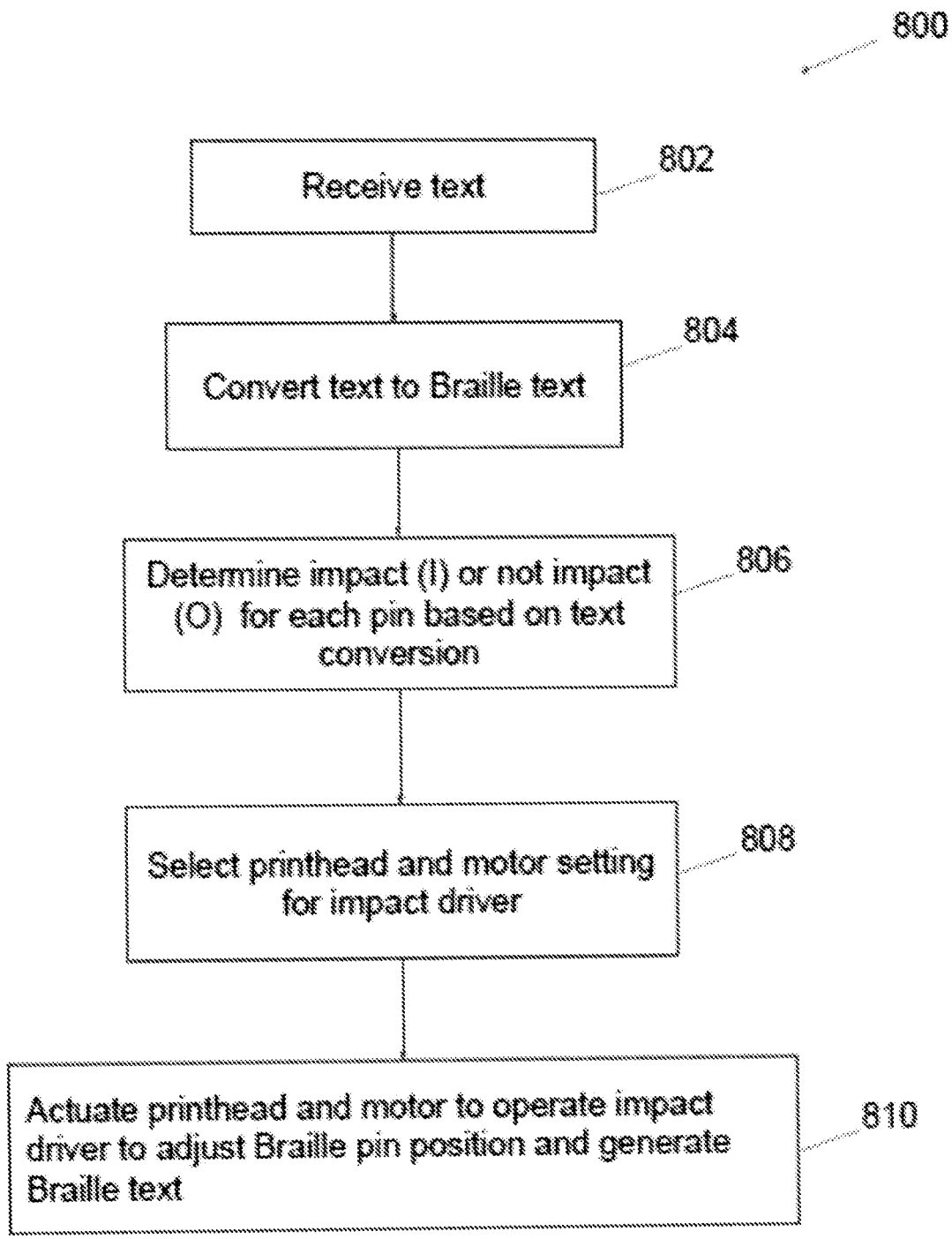
FIG. 8 shows an example method of generating a pattern of raised and lowered pins representative of Braille text on a Braille display device.
Figure 9:
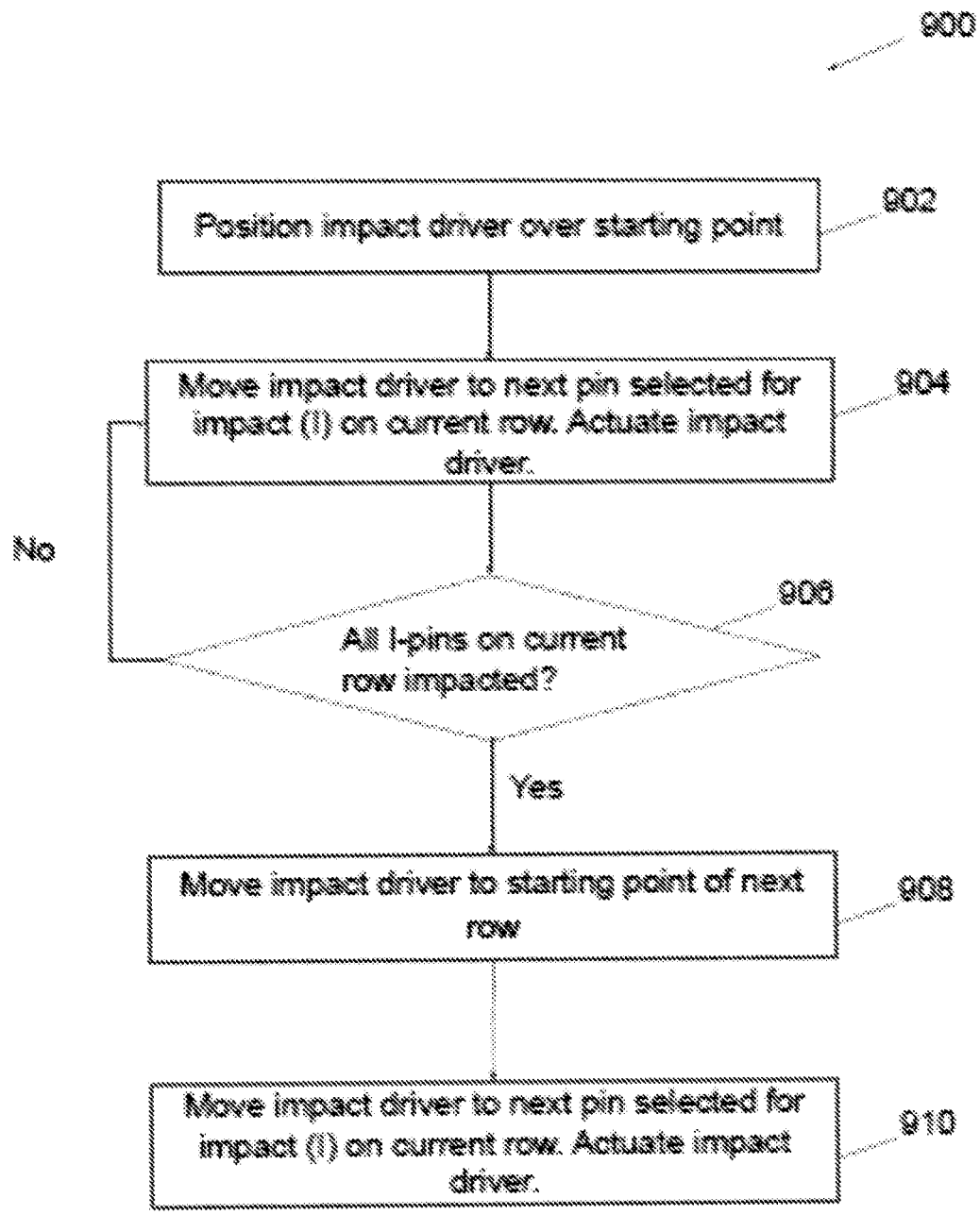
FIG. 9 shows an example method of actuating Braille pins of a Braille display device.

Turning now to FIG. 8, an example method 800 is shown for converting text displayed on a computer, such as computer 102 of FIG. 1, to a Braille pattern for display on a refreshable Braille reader, such as reader 106 of FIG. 1. At least a portion of the steps of method 800 may be performed at the text generator component of the Braille display system.

At 802, text is received for conversion into a Braille pattern representative of a Braille text version of the received text. The received text includes text, images, graphs, etc., that are received from a computer. Herein the text includes content selected by a user for conversion into a Braille text. At 804, the received text is converted into Braille text. For example, a text conversion module of the computer, or of a text generator device coupled to the computer, may be configured with code for translating each alphabet of the text received at 802 into a corresponding Braille letter, adapted in the form of a defined set of dots in a 2×3 matrix. A Braille pattern is subsequently generated via the actions of impact drivers that actuate a series of Braille pins of a refreshable Braille reader. The module may rely on a database that stores each alphabet letter and its corresponding Braille letter. In other embodiments, the text conversion module is configured with code for converting any received non-Braille content into a Braille format.

At 806, the conversion module further converts the Braille letter into a Braille pattern of raised and lowered pins. This is achieved by converting each Braille letter or character into a series of impact (I) or non-impact (O) decisions for corresponding Braille pins of the reader. For example, each dot of the Braille character (e.g., in 2×3 matrix) is translated into an I-pin including an impact decision for the corresponding Braille pin, while each remaining space of the character (e.g., of the 2×3 matrix) is translated into an O-pin including a no-impact decision for the corresponding Braille pins. It will be appreciated, based on the default position of the pins of the reader, or the target reader face on which the Braille pattern is to be displayed, the converse may be true.

As an example, the conversion is determined as a function of the surface of the reader onto which the Braille pattern is to be generated. In some embodiments, the Braille pattern is, by default, generated on a first, front surface of the reader.

This corresponds to the surface onto which the impact driver acts and on which an impacted pin is lowered upon actuation. In other embodiments, the Braille pattern is, by default, generated on a second, bottom surface of the reader, opposite the front surface. This corresponds to the surface from which an impacted pin is raised upon actuation by the impact driver. In still other embodiments, the reading surface is selectable by a user and the text generation is adjusted in accordance.

In the examples described below, the impact driver is shown acting on a front surface of the reader to create the Braille pattern on the opposite surface. This is not meant to be limiting. It will be appreciated that the series of I-pins and O-pins will be reversed when the impact driver is operated on the front surface to create Braille pattern on the same front surface.

Figure 11:
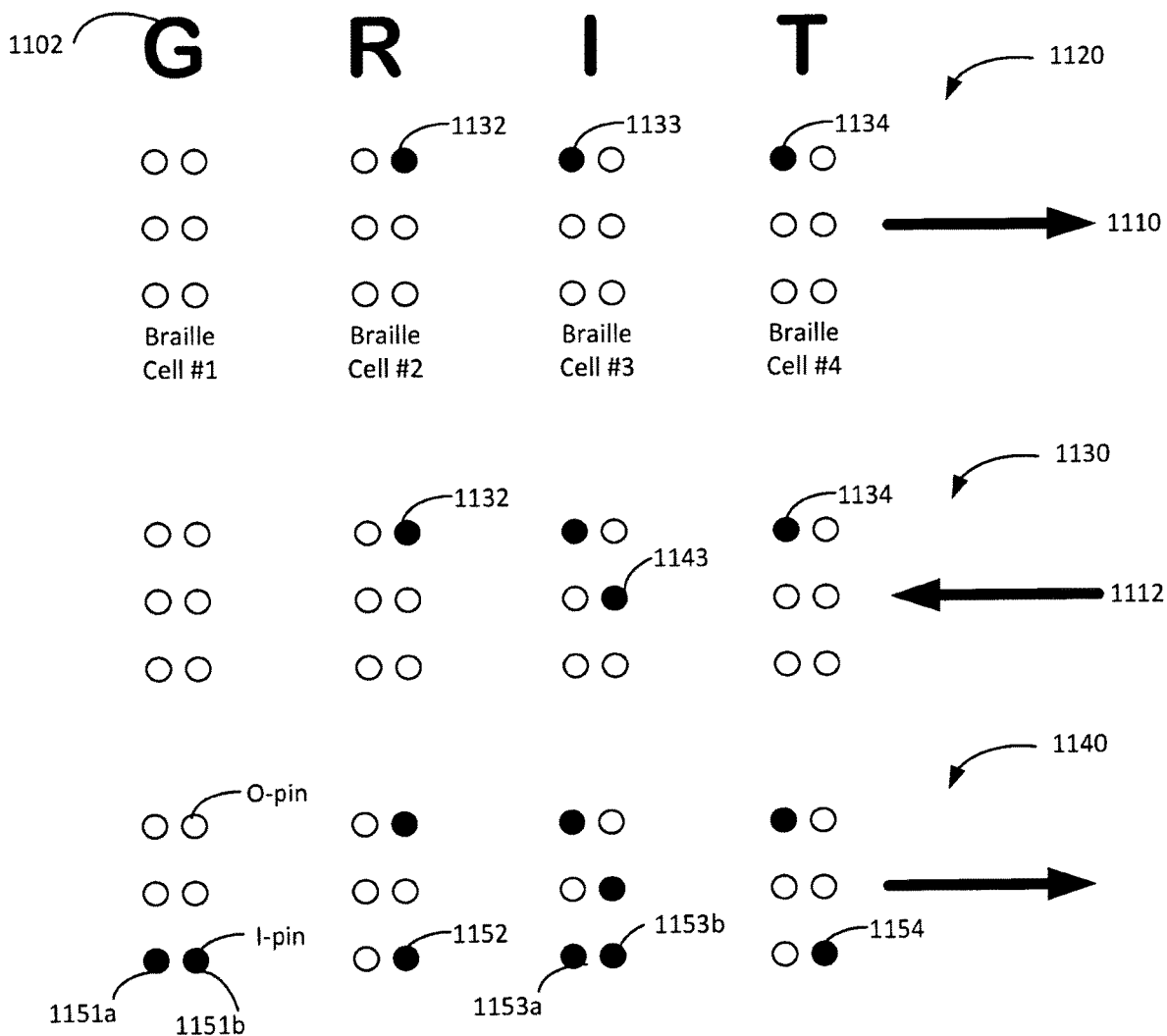
FIG. 11 shows an example conversion of regular text to a pattern of raised and lowered pins representative of an equivalent Braille text by moving an impact driver and impacting Braille pins of a display device.

With reference to the example of FIG. 11, an alphabet text character 1102 (the letter G) is translated into a Braille text character 1104 which includes two I-pins and four O-pins in Braille cell 1106. In this specific character, the two pins of the bottom row of the 2×3 matrix of Braille cell 1106 are I-pins while remaining pins are O-pins. Thus, it is determined that the impact driver needs to impact, on the front surface of the reader, the bottom two pins of this Braille cell while not impacting the remaining pins of this particular Braille cell to create the given Braille pattern on the opposite surface.

It will be appreciated that to the create the same Braille character 1104 on the front surface of the reader, the impact driver would need to impact the two pins of the first and second row of Braille cell 1106, thereby lowering them, while not impacting the bottom two pins (1151a, 1151b) of Braille cell 1106, thereby leaving them raised.

Returning to FIG. 8, at 808, the sequence of I-pins and O-pins determined based on the Braille pattern is programmed as a series of impact and non-impact decisions, and accordingly the text generator may select a printhead and motor setting for the impact driver of the text generator. In configurations such as those shown in FIG. 7A, where the reader is moved along an x-y plane via a first printhead, the settings of the first printhead may be adjusted to position an I-pin pin corresponding to an I-pin Braille dot of a first Braille cell below the impact driver at the onset of the operation. Then, a printhead of the impact driver and motor settings for the impact driver (including power of impact, frequency of impact, and duration of impact) may be selected to drive the Braille pin in a z-direction. At 810, the printhead and motor are actuated to operate the impact driver and impact a selected Braille. In one example, the actuation is enabled based on signals received from the microprocessor of the text generator. This action generates a Braille text via the Braille pins of the reader as an equivalent of the Braille dot on Braille paper. In configurations such as those shown in FIG. 7B, where the impact driver is moved relative to an x-y plane of the reader via a printhead, the settings of the printhead and the motor settings for the impact driver may be adjusted together to position the impact driver relative to a target Braille pin and then drive the Braille pin in a z-direction to generate the equivalent of the Braille dot on the reader. In each case, an impact decision (I) for an I-pin results in the impact driver being actuated to move the Braille pin creating the equivalent of a Braille dot, while a non-impact decision (O) for an O-pin results in the impact driver skipping the pin at that position.

Steps 808 and 810 are reiterated to impact Braille pins of the Braille reader in a sequence that generates a series of Braille dots corresponding to the Braille pattern determined at 804. A detailed description of the method of steps 808-810 is described with reference to the method of FIG. 9. In some examples, the impact driver may be positioned to impact pins and create one Braille cell at a time. In other examples, as illustrated with reference to the example of FIG. 11, the text generator may be operated to move in a first direction 1110, from a first (e.g., left) edge of the reader to an opposite (e.g., right) edge of the reader, along a row, and impact selected pins of consecutive Braille cells. Upon reaching the opposite edge, the impact driver is repositioned at a subsequent row (which may be above or below the initial row) and then moved in a second direction 1112, opposite the first direction, from the opposite edge towards the first edge, and impact selected pins of consecutive Braille cells of this row. Alternatively, the impact driver may only move unidirectionally. After impacting Braille pins of a first row, the impact driver may be repositioned at the first edge of the reader at the subsequent row and may restart the operation while moving from the first edge towards the opposite edge in the first direction 1110.

A detailed method of performing the steps of positioning and actuating the impact driver to create a Braille pattern (or Braille dot equivalents) on the reader is now described at method 900.

At 902, the impact driver is positioned at a defined starting point. This may be a default position of the impact driver relative to the reader at the onset of a text generation procedure. In one example, the default position is a first corner of the reader, such as a top left corner. In another example, the default position is at the leftmost edge of the reader along a first, top-most row of Braille pins.

At 904, the impact driver is positioned over a first pin selected for being impacted (I-pin) on the current row. This may include moving a printhead coupled to the impact driver to position the driver over the Braille pin or moving a printhead coupled to the reader to position the selected Braille pin under the impact driver. Once positioned, the impact driver is actuated. This includes operating the motor of the impact driver to drive the impact driver onto the top surface of the selected Braille pin, thereby driving the pin into the plane of the reader. Based on motor settings, the impact driver may be driven onto the Braille pin once or a plurality of times (e.g., 2 times, or 3 times) to ensure that the pin has been properly impacted. In embodiments where the Braille pins are driven in to create non-textual Braille content (e.g., images, maps, etc.), the motor settings may be adjusted to provide an impact force that displaces the pin based on the non-textual content.

Once this pin has been actuated, step 904 is repeated to position the impact driver over a subsequent pin selected for being impacted on the current row. Herein, the pins between the first pin and the subsequent pin of the given row are all determined to be non-impact (O) pins. In this way, step 904 is repeated until all defined I-pins of the given row have been impacted and the impact driver has reached the end of the current row (such as when the impact driver reaches the second edge of the reader). In some systems, a mechanical stopper may define the edges of the reader and it may be inferred that the edge of the reader, and the ending point of the impact driver, has been reached when the impact driver touches the mechanical stopper.

At 906, upon confirming that all identified I-pins of the current row have been impacted, the method moves to 908 wherein the impact driver is positioned at the starting point of the next row. In one example, where the impact driver is configured for unidirectional movement, the starting point for the next row may be the leftmost edge of the reader along the selected row of Braille pins. Alternatively, where the impact driver is configured for bidirectional movement, the starting point for the next row may be the rightmost edge of the reader along the selected row of Braille pins, immediately below the ending point for the previous row.

At 910, as at 904, the impact driver is positioned over a first pin of the given row that is selected for being impacted (I-pin). Once positioned, the impact driver is actuated.

Turning now to FIG. 11, an example conversion of regular text to a Braille pattern representative of Braille text by moving the impact driver along a row of pins and impacting selected pins is shown. In the depicted example, the text comprises four letters which are joined to create the word G-R-I-T. Braille pins are arranged in clusters that result in Braille cells 1106 (of 2×3 format) being created. The top row of pins includes the top 2 pins of each of 4 consecutive Braille cells, the next row of pins includes the middle 2 pins of each of the 4 Braille cells, and the bottom row of pins includes the bottom 2 pins of each of the 4 Braille cells (hereafter referred to Braille cells 1, 2, 3, 4).

On the first pass, as shown at 1120, while moving over the top row in a first direction 1110, the impact driver is positioned to impact I-pins 1132, 1133, and 1134 of Braille cells 2, 3, and 4, respectively, while skipping remaining pins of this row. On the second pass, as shown at 1130, while moving over the middle row in a second direction 1112, the impact driver is positioned to only impact I-pin 1143 of Braille cell 3 while skipping all remaining pins of this row. On the third pass, as shown at 1140, while moving over the bottom row again in the first direction 1110, the impact driver is positioned to impact I-pins 1151*a* and 1151*b* of Braille cell 1, I-pin 1152 of Braille cell 2, I-pins 1153*a*, and 1153*b* of Braille cell 3 and 1154 of Braille cell 4. In this way, G-R-I-T (character 1102) is converted to the corresponding Braille text (character 1104).

It will be appreciated that while the approach shows pins on alternating rows being impacted by moving in alternating directions 1110, 1112, in other examples, where the printheads move unidirectionally (only direction 1110 or direction 1112), the same pins may be impacted on consecutive unidirectional passes of the impact driver.

After receiving an impact force from the impact driver, the impacted I-Braille pins are held in place without the need for any external support. In particular, friction between the pins and the body of the Braille reader is sufficient to hold the pins in a given position (as shown in FIG. 2) until impacted again to change position. That is, the pins are self-held in place via the tautness of the interaction between the pin and the perforation the pin is positioned in, without the need for any latching mechanism or electrical, mechanical, or electromechanical force.

It will be appreciated that while the examples show the Braille pins of the Braille reader being impacted by the impact driver of the text generator to create Braille text on the reader, in other embodiments, the text may be created manually. For example, a person may create Braille text on the Braille reader for a user by manually adjusting the position of individual Braille pins of individual Braille cells to create the text.

Figure 10:
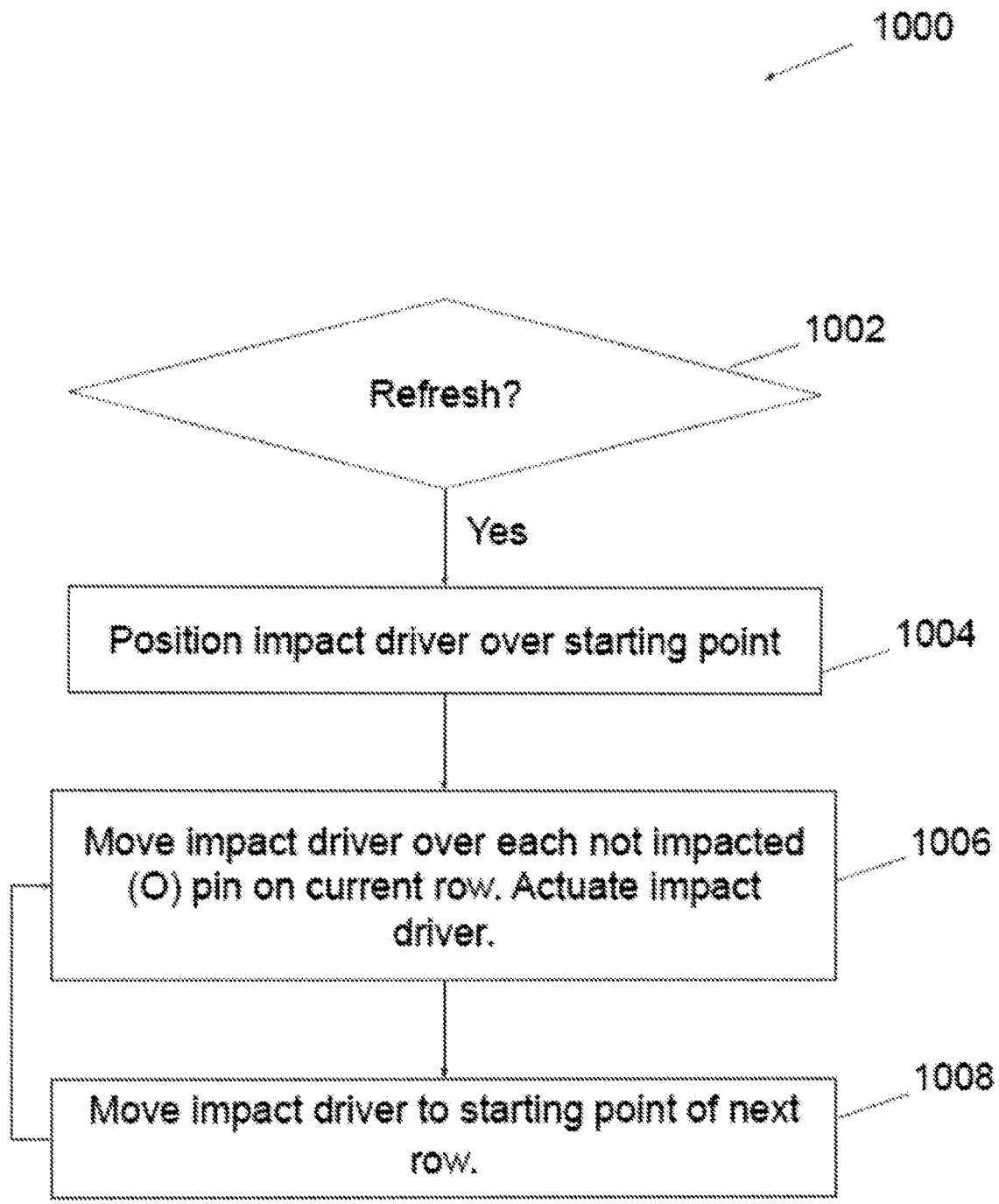
FIG. 10 shows an example method of refreshing Braille pins of a Braille display device.

Method 1000 of FIG. 10 describes an example refresh operation that may be executed by operating an impact driver of a text generator. The method enables the same impact driver that is used for generating the Braille pattern representative of the Braille text on the display device by impacting pins to also be used to refresh the reader after the Braille pattern (and its equivalent text) has been read.

At 1002, upon confirming that a refresh command has been received from a user, such as at a computer terminal coupled to the text generator, the method moves to 1004 wherein the impact driver is positioned at a starting point for a refresh operation. In one example, the starting point is at or above the leftmost Braille pin of a top row of the reader. From the starting point, at 1006, a printhead and motor is actuated to move the impact driver over a first non-impacted pin (O-pin) of the current row and then operate the impact driver to drive the O-pin into the plane of the reader. Then the impact driver is repositioned over the next O-pin of the current row and then the impact driver is operated to drive the O-pin in. This step is continued until all O-pins of the current row have been driven in. As a result, all Braille pins of the current row are now impacted into the reader and thereby "refreshed" to a common position. At 1008, the impact driver is positioned at the starting point of the next row and the step of impacting each O-pin of the given row is now repeated until all pins of the current row are driven in. Steps 1006-1008 are reiterated until all Braille pins of the reader have been refreshed.

Embodiments are disclosed of a refreshable Braille displaying device, comprising a body having a front surface and a rear surface, and a plurality of perforations that run through the body between the front and rear surface; and a plurality of Braille pins individually accommodated within the plurality of perforations of the body, each of the plurality of pins configured to be impacted between a first position extending through the body and protruding out of the front surface, and a second position extending through the body and protruding out of the rear surface, wherein one or more of the plurality of pins are configured to be impacted to create a pattern of raised and lowered pins, the pattern corresponding to a Braille text that is displayed on the device for reading by a user via tactile interaction, the raised and lowered pins of the pattern held in place via friction between the pins and the body. In further embodiments of the device, additionally or optionally, the raised and lowered pins of the pattern are held in place without mechanical or electrical support. In further embodiments of the device, additionally or optionally, the plurality of perforations are distributed through the body in clusters, and wherein the individually accommodated Braille pins in each cluster are impacted to create a single Braille character of the Braille text. In further embodiments of the device, additionally or optionally, the pattern corresponding to the Braille text is based on a non-Braille text. In further embodiments of the device, additionally or optionally, the non-Braille text and the Braille text are in a common language. In further embodiments of the device, additionally or optionally, the non-Braille text and the Braille text are in different languages. In further embodiments of the device, additionally or optionally, the device is configured to be coupled to a text generator having an impact driver, the text generator communicatively coupled to a controller with computer-readable instructions, and wherein the one or more of the plurality of pins are configured to be impacted by the impact driver of the text generator in accordance with the non-Braille text received at the text generator from the controller. In further embodiments of the device, additionally or optionally, the pattern corresponding to the Braille text is generated on the front surface of the body. In further embodiments of the device, additionally or optionally, the pattern corresponding to the Braille text is generated on the rear surface of the body. In further embodiments of the device, additionally or optionally, a default position of the plurality of pins of the device includes each of the plurality of pins in the first position or each of the plurality of pins in the second position. In further embodiments of the device, additionally or optionally, the pattern of raised and lowered pins is configured to be refreshed wherein each of the plurality of pins is returned to the default position. In further embodiments of the device, additionally or optionally, the device is refreshed manually or via the impact driver of the text generator.

Embodiments are also disclosed of a refreshable Braille display system, comprising a controller with computer-readable instructions for receiving a non-Braille text and converting the non-Braille text into a Braille text; a mechanical display device comprising a perforated body, and a plurality of Braille pins individually accommodated within a plurality of perforations of the perforated body, the pins held in place via friction between each individual pin and a corresponding perforation, wherein one or more of the plurality of pins are configured to be impacted to display a pattern of raised and lowered pins corresponding to the Braille text, the displayed pattern corresponding to the Braille text configured to be read by a user via tactile interaction; and a text-generator device comprising an impact driver, a motor for actuating the impact driver, a surface for receiving the display device thereon, a printhead configured to position the impact driver relative to a Braille pin of the received display device, and a microprocessor. In further embodiments of the system, additionally or optionally, the controller includes instructions for receiving the non-Braille text in a first language and converting the non-Braille text into Braille text in a second, different language. In further embodiments of the system, additionally or optionally, the microprocessor includes instructions for selecting the one or more of the plurality of pins to be impacted by the impact driver based on the Braille text generated at the controller. In further embodiments of the system, additionally or optionally, the microprocessor includes instructions for actuating the printhead to sequentially position the impact driver over the selected one or more of the plurality of Braille pins. In further embodiments of the system, additionally or optionally, the microprocessor includes instructions for actuating the impact driver to sequentially apply an impacting force on the selected one or more of the plurality of Braille pins. In further embodiments of the system, additionally or optionally, the impacting force applied by the impact driver transitions a corresponding Braille pin between a first position extending through the perforated body and protruding out of a front or rear surface of the perforated body, to a second position extending through the body and protruding out of a remaining of the front or rear surface. In further embodiments of the system, additionally or optionally, the sequential application of the impacting force by the impact driver displays the pattern of raised and lowered pins corresponding to the Braille text on the front surface of the perforated body of the display device. In further embodiments of the system, additionally or optionally, the sequential application of the impacting force by the impact driver displays the pattern of raised and lowered pins corresponding to the Braille text on the rear surface of the perforated body of the display device. In further embodiments of the system, additionally or optionally, the displayed pattern of raised and lowered pins includes the pins being held in place following the impacting force via the friction and without external support. In further embodiments of the system, additionally or optionally, the plurality of pins are distributed through the perforated body in clusters, and wherein the impacting force is applied on individually accommodated Braille pins of each cluster to create a single Braille character of the Braille text. In further embodiments of the system, additionally or optionally, the microprocessor includes further instructions for, after the pattern is displayed on the display device, refreshing the display device by returning each of the plurality of pins to a default position, the default position including each of the plurality of pins in the first position or each of the plurality of pins in the second position.

Embodiments are also disclosed of a method for displaying Braille text. An example method comprises receiving a non-Braille text; translating the non-Braille text into a Braille text characterized by a pattern of dots; and displaying the Braille text by adjusting a position of one or more Braille pins of a display device to create a series of raised and lowered pins corresponding to the pattern of dots, wherein following the adjusting, the raised and lowered Braille pins are held in place in the display device only via friction. In further embodiments of the method, additionally or optionally, the translating includes converting each character of the non-Braille text into a corresponding character of the Braille text, wherein each corresponding character of the Braille text is configured as a unique sequence of dots and empty spaces, and wherein the position of one or more Braille pins of the display device are adjusted to generate a raised pin for each dot of the unique sequence and a lowered pin for each empty space of the unique sequence. In further embodiments of the method, additionally or optionally, the display device includes a perforated body with a plurality of the Braille pins, each Braille pin individually accommodated within each perforation of the perforated body, the plurality of Braille pins organized in a matrix of rows and columns, and wherein the adjusting includes operating an impact driver to sequentially raise or lower Braille pins of a given row of the matrix in accordance with the pattern of dots. In further embodiments of the method, additionally or optionally, the impact driver is operated to sequentially raise or lower Braille pins of a first row of the matrix in accordance with the pattern of dots before sequentially raising or lowering Braille pins of a second, subsequent row of the matrix in accordance with the pattern of dots. In further embodiments of the method, additionally or optionally, a direction of motion of the impact driver along the first row is same as the direction of motion along the second row. In further embodiments of the method, additionally or optionally, a direction of motion of the impact driver along the first row is opposite the direction of motion along the second row. In further embodiments of the method, additionally or optionally, sequentially raising or lowering Braille pins of the given row of the matrix in accordance with the pattern of dots includes sequentially raising or lowering Braille pins to sequentially display at least a portion of a first character of the Braille text and then at least a portion of a second, subsequent character of the Braille text.

As will be appreciated by one of ordinary skill in the art, the methods described herein represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. While the invention has been described with reference to specific embodiments, modifications and variations of the invention may be constructed without departing from the scope of the invention, which is defined in the following claims.

The invention claimed is:

1. A refreshable Braille displaying device, comprising:
a body having a front surface and a rear surface, and a plurality of perforations that run through the body between the front and rear surface; and
a plurality of Braille pins individually accommodated within the plurality of perforations of the body, each of the plurality of pins configured to be impacted between a first position extending through the body and protruding out of the front surface, and a second position extending through the body and protruding out of the rear surface, wherein one or more of the plurality of pins are configured to be impacted to create a pattern of raised and lowered pins, the pattern corresponding to a Braille text that is displayed on the device for reading by a user via tactile interaction, the raised and lowered pins of the pattern held in place via friction between the pins and the body.

2. The device of claim 1, wherein the raised and lowered pins of the pattern are held in place without mechanical or electrical support.

3. The device of claim 1, wherein the plurality of perforations are distributed through the body in clusters, and wherein the individually accommodated Braille pins in each cluster are impacted to create a single conventional-sized Braille character of the Braille text.

4. The device of claim 1, wherein the pattern corresponding to the Braille text is based on a non-Braille input, the non-Braille input including non-Braille text.

5. The device of claim 4, wherein the non-Braille text and the Braille text are in a common language or wherein the non-Braille text and the Braille text are in different languages.

6. The device of claim 4, wherein the device is configured to be coupled to a text generator having an impact driver, the text generator communicatively coupled to a controller with computer-readable instructions, and wherein the one or more of the plurality of pins are configured to be impacted by the impact driver of the text generator in accordance with the non-Braille text received at the text generator from the controller.

7. The device of claim 1, wherein the pattern corresponding to the Braille text is generated on the front or rear surface of the body, and wherein a default position of the plurality of pins of the device includes each of the plurality of pins in the first position or each of the plurality of pins in the second position.

8. The device of claim 7, wherein the pattern of raised and lowered pins is configured to be refreshed wherein each of the plurality of pins is returned to the default position, and wherein the device is refreshed manually or via the impact driver of the text generator.

9. A refreshable Braille display system, comprising:
a controller with computer-readable instructions for receiving a non-Braille input and converting the non-Braille input into a Braille output;
a mechanical display device comprising a perforated body, and a plurality of Braille pins individually accommodated within a plurality of perforations of the perforated body, the pins held in place via friction between each individual pin and a corresponding perforation, wherein one or more of the plurality of pins are configured to be impacted to display a pattern of raised and lowered pins corresponding to the Braille output, the displayed pattern corresponding to the Braille output configured to be read by a user via tactile interaction; and
a text-generator device comprising an impact driver, a motor for actuating the impact driver, a surface for receiving the display device thereon, a printhead configured to position the impact driver relative to a Braille pin of the received display device, and a microprocessor.

10. The system of claim 9, wherein the non-Braille input includes one or more of a textual input, an image input, and a tabular input, and wherein the controller includes instructions for receiving the non-Braille input in a first language and converting the non-Braille input into Braille output in a second, different language.

11. The system of claim 9, wherein the microprocessor includes instructions for:
selecting the one or more of the plurality of pins to be impacted by the impact driver based on the Braille output generated at the controller; and
actuating the printhead to sequentially position the impact driver over the selected one or more of the plurality of Braille pins.

12. The system of claim 11, wherein the microprocessor includes instructions for actuating the impact driver to sequentially apply an impacting force on the selected one or more of the plurality of Braille pins, wherein the impacting force applied by the impact driver transitions a corresponding Braille pin between a first position extending through the perforated body and protruding out of a front or rear surface of the perforated body, to a second position extending through the body and protruding out of a remaining of the front or rear surface.

13. The system of claim 11, wherein the sequential application of the impacting force by the impact driver displays the pattern of raised and lowered pins corresponding to the Braille output on the front surface or the rear surface of the perforated body of the display device.

14. The system of claim 13, wherein the displayed pattern of raised and lowered pins includes the pins being held in place following the impacting force via friction between the pins and the display device and wherein the pins are held in place without external support.

15. The system of claim 14, wherein the plurality of pins are distributed through the perforated body in clusters, wherein the impacting force is applied on individually accommodated Braille pins of each cluster to create a single Braille character of the Braille output, wherein the single Braille character is sized to have standard Braille character dimensions, and wherein the microprocessor includes further instructions for, after the pattern is displayed on the display device, refreshing the display device by returning each of the plurality of pins to a default position, the default position including each of the plurality of pins in the first position or each of the plurality of pins in the second position.

16. A method, comprising:
receiving a non-Braille text;
translating the non-Braille text into a Braille text characterized by a pattern of dots; and
displaying the Braille text by adjusting a position of one or more Braille pins of a display device to create a series of raised and lowered pins corresponding to the pattern of dots, wherein following the adjusting, the raised and lowered Braille pins are held in place in the display device only via friction.

17. The method of claim 16, wherein the translating includes converting each character of the non-Braille text into a corresponding character of the Braille text, wherein each corresponding character of the Braille text is configured as a unique sequence of dots and empty spaces, and wherein the position of one or more Braille pins of the display device are adjusted to generate a raised pin for each dot of the unique sequence and a lowered pin for each empty space of the unique sequence.

18. The method of claim 16, wherein the display device includes a perforated body with a plurality of the Braille pins, each Braille pin individually accommodated within each perforation of the perforated body, the plurality of Braille pins organized in a matrix of rows and columns, and wherein the adjusting includes operating an impact driver to sequentially raise or lower Braille pins of a given row of the matrix in accordance with the pattern of dots.

19. The method of claim 18, wherein the impact driver is operated to sequentially raise or lower Braille pins of a first row of the matrix in accordance with the pattern of dots before sequentially raising or lowering Braille pins of a second, subsequent row of the matrix in accordance with the pattern of dots.

20. The method of claim 19, wherein a direction of motion of the impact driver along the first row is same as, or opposite to, the direction of motion along the second row, and wherein sequentially raising or lowering Braille pins of the given row of the matrix in accordance with the pattern of dots includes sequentially raising or lowering Braille pins to sequentially display at least a portion of a first character of the Braille text and then at least a portion of a second, subsequent character of the Braille text.

* * * * *